(12) United States Patent
Klein et al.

(10) Patent No.: US 8,275,578 B2
(45) Date of Patent: Sep. 25, 2012

(54) DIAGNOSTICS FOR CENTRALLY MANAGED COMPUTER SYSTEM

(75) Inventors: Bradley Klein, Fort Collins, CO (US); Toran K. Kopren, Fort Collins, CO (US); Bryan Joseph Jacquot, Mitchell, SD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1023 days.

(21) Appl. No.: 12/238,017

(22) Filed: Sep. 25, 2008

(65) Prior Publication Data

US 2009/0265139 A1    Oct. 22, 2009

Related U.S. Application Data

(60) Provisional application No. 61/046,830, filed on Apr. 22, 2008.

(51) Int. Cl.
*G06F 11/30* (2006.01)
*G06F 11/00* (2006.01)

(52) U.S. Cl. ......... 702/183; 702/187; 702/188; 702/189

(58) Field of Classification Search .......... 702/121–123, 702/183–189
See application file for complete search history.

(56) References Cited

U.S. PATENT DOCUMENTS 6,324,659 B1 * 11/2001 Pierro ............................. 714/48
6,397,245 B1 *  5/2002 Johnson et al. ............... 709/203

* cited by examiner

*Primary Examiner* — Phuong Huynh

(57) ABSTRACT

The present invention provides a diagnostic method for a centrally managed computer system. The method provides central diagnostic expertise regarding central management software used for managing a system. The method further provides for managed software that integrates with the central management software; the managed software includes its own diagnostic expertise. The method further provides for importing the managed diagnostic expertise and combining it with central diagnostic expertise to define collective diagnostic expertise.

7 Claims, 2 Drawing Sheets

| COLLECTIVE EXPERTISE 25 |
|---|
| MANAGEMENT-TYPE EXPERTISE 51 |
| MASTER MANAGEMENT PROCEDURES 33A |
| LOCAL PLUG-IN MANAGEMENT PROCEDURES 39A |
| CENTRAL PLUG-IN MANAGEMENT PROCEDURES 45A |
| DISTRIBUTED PLUG-IN MANAGEMENT PROCEDURES 61A |
| CONNECTIVITY-TYPE EXPERTISE 53 |
| MASTER MANAGEMENT PROCEDURES 33B |
| LOCAL PLUG-IN MANAGEMENT PROCEDURES 39B |
| CENTRAL PLUG-IN MANAGEMENT PROCEDURES 45B |
| DISTRIBUTED PLUG-IN MANAGEMENT PROCEDURES 61B |
| MANAGED-TYPE EXPERTISE 55 |
| MASTER MANAGEMENT PROCEDURES 33C |
| LOCAL PLUG-IN MANAGEMENT PROCEDURES 39C |
| CENTRAL PLUG-IN MANAGEMENT PROCEDURES 45C |
| DISTRIBUTED PLUG-IN MANAGEMENT PROCEDURES 61C |

FIG. 2

DIAGNOSTICS FOR CENTRALLY MANAGED COMPUTER SYSTEM

This application claims the benefit of the 2008 Apr. 22 filing date of U.S. Provisional Patent Application Ser. No. 61/046,830.

BACKGROUND OF THE INVENTION

Centralized management can simplify the task of administering a large, complex, distributed computer system at the cost of adding an additional layer of software. Products that integrate into central management software (CMS), e.g., to extend and/or take advantage of its capabilities, encounter many dependencies on other products including: products providing the general CMS functionality, network connectivity products, and managed system general communication agents (WBEM (Web-Based Enterprise Management), SSH (Secure Shell), SNMP (Simple Network Management Protocol). In addition, there can be product-specific software health dependencies (including but not limited to operating-system-specific patch dependencies) on both the CMS and managed systems.

When a problem occurs, its source must be identified: the problem may be due to management software, managed software, connectivity software, or hardware, or some combination of these. To diagnose a problem, a system administrator may refer to on-hand documentation or access customer support. However, the amount of documentation and expertise to be considered can be unwieldy. Furthermore, the solution to a problem is often the installation of a software update, which may cause incompatibilities, requiring further updates. All these software interdependencies burden an administrator with keeping abreast of trouble-shooting updates. What is needed is an approach that makes centrally managing a complex computer system more manageable.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

FIG. 2 is a detail block diagram of a collective expertise of the system of FIG. 1.

DETAILED DESCRIPTION

Figure 1:
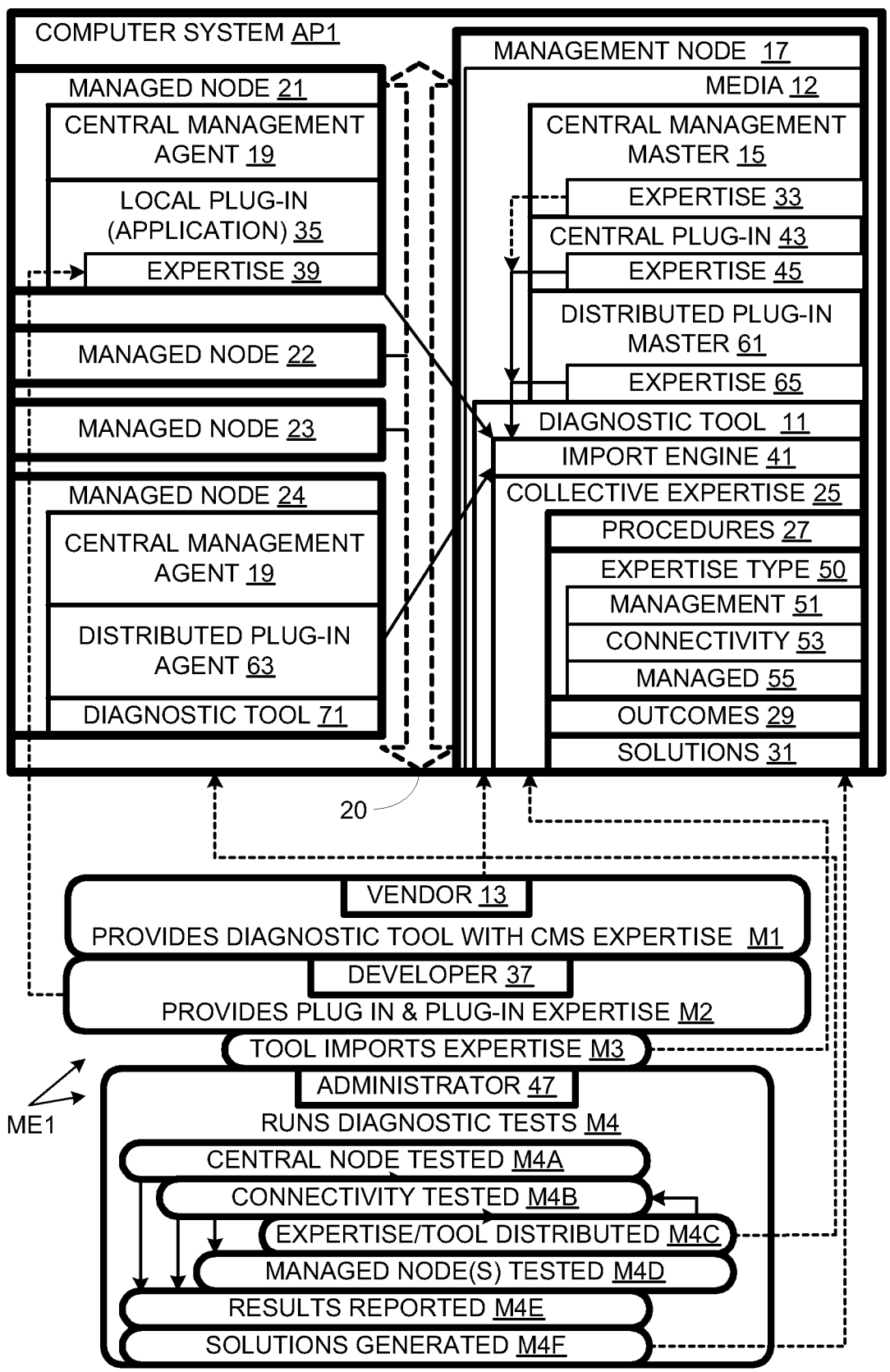
FIG. 1 is a combination schematic illustration and flow chart showing a centrally managed computer system and a diagnostic method for the system in accordance with embodiments of the invention.

The present invention provides a diagnostic framework for handling problems in a centrally managed computer system. The framework can be used by developers of central management software to convey diagnostic procedures, possible outcomes, and solutions. The management software "absorbs" the diagnostic expertise provided by the developers so that it can monitor the health of the centrally managed system and provide detailed diagnostic information and solutions to detected problems on a system-wide basis. This approach coalesces expertise for diverse plug-ins into an integrated and centralized diagnostic tool, substantially freeing the administrator from having to master support documentation and troubleshooting procedures for large amounts and varieties of computer hardware and software.

A method ME1 is represented in the flow chart of FIG. 1. At method segment M1, a diagnostic tool 11 is provided in computer readable media 12. Generally, this tool is provided by the vendor 13 of the central management software, which can include a central management master program 15 on a management server node 17 and central management agent software 19 on managed server nodes 21-24. Herein, "managed server" and "managed nodes' refer to managed nodes other than the central management server or node, even though the central management server or node is also managed in some sense. Although only four managed nodes are shown, the invention provides for fewer, more, or, most commonly, many more managed nodes. A node can include one or more devices connected on a network to the central management server; for example, a management node can include multiple management servers working together. The managed nodes can include servers, printers, network switches, and other network devices. The various nodes communicate over network 20.

The invention provides for a diagnostic tool that is integrated with a central management master, or that is a separate application. In FIG. 1, diagnostic tool 11 is a plug-in to central management master program 15. Diagnostic tool 11 includes collective diagnostic expertise 25, which is a set of diagnostic procedures 27, possible outcomes 29, and recommended or implemented solutions 31. Collective expertise 25 includes management expertise 33, which specifies procedures for diagnosing central management master program 15. These procedures can include checking whether central management master program 15 is running, whether the version is correct, whether the required updates have been installed, etc.

At method segment M2, a plug-in 35 or other software that can integrate with central management master 15 is provided, e.g., by vendor 13 or a $3^{rd}$ party developer 37. "Managed" expertise 39 is provided for and along with plug-in 35. Managed expertise 39 is a set of diagnostic procedures designed for plug in 35. These may include procedures to be run on management node 17 (e.g., to check the version of the CMS) or on a managed server 21 that the plug-in runs on. Typically, this managed expertise 35 is provided by the plug-in developer 37 in a format or according to a framework associated with diagnostic tool 11.

At method segment M3, managed expertise 39 is imported and combined with management expertise 33 to form collective expertise 25. In the embodiment of FIG. 1, diagnostic tool 11 includes an import engine 41 that serves this function. In other embodiments, the import engine can be a separate program or plug-in or can be integrated into the CMS master software. In the illustrated embodiment, the developer expresses the managed expertise 39 according to a framework understood by import engine 41. This framework can be provided by vendor 13. Just as central management master 15 can include hooks for plug-ins, diagnostic tool 11 can include hooks for imported expertise.

In practice, there can be many plug-ins from many different developers. Each plug-in can have its own expertise and all of these can be imported by import engine 41. This permits centralized control of diagnosis, while taking advantage of trouble-shooting expertise by the developers of each of the plug-ins. Instead of requiring an administrator 47 to guess which diagnostic procedures to run, the present invention makes it easy to run all diagnostic procedures to achieve a comprehensive diagnosis. This testing can be automated and performed periodically, even when no problem is observed by the administrator. Thus, the invention can give periodic, proactive indications of system health—in other words, advanced warnings of trouble that may lie ahead.

The actual importing can be labor intensive or automated. At one extreme, the developers for the diagnostic tool and the developers for managed applications can collaborate on how best to integrate the latter's expertise into the former's tool; the tool can then be programmed or updated in accordance with the outcome of the dialog. At the other extreme, the developer of a managed application provides an expertise file specifying procedures, outcomes, and solutions. Upon installation of managed application, the diagnostic tool reads the managed expertise file and integrates its information into its own collective expertise file.

The result of the importation is represented in greater detail in FIG. 2. The procedures for each source expertise 33, 39, 45, and 55 have been categorized by expertise type. Thus, the procedures of central management master expertise 33 have been divided into management-type expertise procedures 33A, connectivity-type procedures 33B, and managed-type procedures 33C. Likewise, local plug-in expertise 39 has been divided into procedures 39A, 39B, 39C; central plug-in expertise 45 has been divided into procedures 45A, 45B, and 45C; and distributed plug-in expertise 65 has been divided into procedures 65A, 65B, and 65C. Respective outcomes and solutions are provided for each of these procedures. Upon importation into collective expertise 25, these procedures are rearranged by type. Thus, procedures 33A, 39A, 45A, and 61A are components of management-type expertise 51 to be performed in the same batch of procedures. Likewise, procedures 33B, 39B, 45B, and 61B are all components of connectivity-type expertise 53; and procedures 33C, 39C, 45C, and 61C, are part of managed-type expertise 55.

At method segment M4, a diagnostic sequence is run. This can be triggered or scheduled by system administrator 47. For example, if a fault is detected or performance is unduly sluggish, an administrator may initiate a diagnosis. Alternatively, an administrator can schedule a diagnostic sequence, e.g., at a time of expected low demand. In the latter case, an administrator can schedule periodic, e.g., nightly, health checks to catch problems even in the absence of symptoms.

Since the expertises associated with individual plug-ins are gathered in a collective expertise, they can be handled in a coordinated fashion. Thus, the invention provides for categorizing procedures according to expertise type 50, e.g., management type 51, connectivity type 53, and managed type 55. These procedures can be performed across plug-ins in order of expertise type. Thus, a diagnostic sequence can being with running procedures relating to the central management node at M4A, then run procedures relating to connectivity at M4B, and then run procedures relating to managed nodes last at M4D. Note that managed procedure can include procedures for diagnosing central management agents 19, as well as managed plug-ins.

In many cases, all three sets of procedures can be conducted from a management node. However, if there is a problem with the central management node or, especially, with connectivity, it may not be possible to test a managed node from the management node. In such cases, the invention provides for distributing the collective expertise 25, e.g., as integrated into diagnostic tool 11, to managed nodes at method segment M4C, e.g., resulting in diagnostic tool 71. The distributed copies can then be run from the managed nodes. In general, the distributed copies can be used to run some of the connectivity procedures and many of the managed procedures.

For each procedure, the associated expertise specifies possible outcomes 29. The possible outcomes might be "pass" versus "fail", or something more detailed. The actual outcome for each procedure is reported at method subsegment M4E. The collective expertise specifies a solution 31 for each possible outcome. Thus, when the procedures are run, a solution is generated at method subsegment M4F. Solution 31 can be a recommendation or an automatically implemented fix.

While the foregoing discussion focuses on a plug-in run from a managed node, the invention also provides for plug-ins, e.g., plug-in 43, running on the management node with expertise 45, and for distributed plug-ins. A distributed plug-in including a master portion 61 on managed node 17 and an agent 63 on managed node 24 serves as an example of the latter. Distributed plug-in master 61 comes with expertise 65 that is imported into the collective expertise 25; expertise 65 includes procedures pertaining to both master 61 and agent 63.

As mentioned above, method ME1 provides for distributing diagnostic tool 11 at method subsegment M4C. One approach is to distribute the diagnostic tool as a single executable file. This works well in a computer system in which all nodes use the same operating system or a common runtime environment (e.g., Java), where different operating systems are involved. For more general environments, a highly portable language like C++ can be used, but some recompiling may be necessary; herein, a "recompiled copy" qualifies as a copy.

An alternative approach to distributing the diagnostic tool is to separate the collective expertise from the expert-system engine. Pre-compiled versions of the engine can be made available for each operation system in the computer system. The expertise can be in the form of a configuration file, such as an XML file. To distribute the tool, the current XML expertise file and the appropriate operating-system specific version of the engine can be installed on a target managed system.

C++ EXAMPLES

This generic trouble-shooting infrastructure provides a scaffolding within which the developer of a CMS plug-in tool can add product specific checks and hook them in to one of three check categories: CMS checks, CMS to managed system checks, and managed system checks. The infrastructure can be implemented as a C++ program using the Command Class design pattern such that the developer simply needs to add a new 'check' class that inherits from a base level class. The developer simply needs to implement the execute( ) method making various API and command calls to assess the product-specific dependency state, and then communicate the check title and result using the generic reporting class.

If a failure is encountered, the developer can then communicate to the infrastructure what the failure was, and what the precise resolution to the problem is. Having implemented the derived class, the implementor then indicates which of the three flavors the new check is, by adding a reference to the new class in the infrastructure class that invokes the various checks. The infrastructure will then invoke the new check and report the result as illustrated in the examples below. In addition to the information displayed to STDOUT, the generic reporting facility will log all commands executed to a log file, and allows developers to add additional verbose information to the log file (including output from commands, errors, etc.).

Example of a CMS Report

Note the following report is provided as a concrete example for expository purposes. This example is not intended as limiting. For example, one can run the same diagnostic tool on the same system at a different time and get a different report. One can run the same diagnostic tool on a different system; in that case, the collective expertise and the report would be different. In addition, one can run different diagnostic tools in accordance with different embodiments of the invention and get a variety of results.

| | |
|---|---|
| HP SIM running | [FAIL] |
| ISSUE: The HP SIM product does not appear to have a valid configuration status and this will affect the operation of the VSE Management software. The mxinitconfig utility returned warnings or errors during its execution. | |
| RESOLUTION: Use 'mxinitconfig-l' to list the configuration status of HP SIM and verify that all checks have a valid status. If needed, use 'mxinitconfig-a' to configure HP SIM. Refer to the "HP Systems Insight Manager Installation and User Guide" for assistance. Especially note any kernel parameter warnings or errors in the mxinitconfig log file and address them before continuing. | |
| HP SIM memory configuration | [PASS] |
| VSE Management software running | [PASS] |
| Ensure HP Integrity VM not installed on CMS | [PASS] |
| Localhost name resolution | [PASS] |
| VSE manageable systems discovered in HP SIM | [PASS] |
| Application Discovery server running | [PASS] |
| CMS required patches installed | [PASS] |
| File system free space | [PASS] |
| Java JRE bundle installed | [PASS] |

Result Summary:
10 verification check(s) performed on 1 system(s)
9 check(s) passed
1 check(s) failed
0 check(s) warned
0 check(s) not applicable Example of a Connectivity (Link) Report

| | |
|---|---|
| Managed system hostname resolution | [PASS] |
| WBEM port open | [PASS] |
| WBEM authentication | [PASS] |
| SSH port open | [PASS] |
| SSH authentication | [PASS] |
| Trial or permanent license applied | [PASS] |
| Capacity Advisor data collection | [PASS] |

Result Summary:
7 verification check(s) performed on 1 system(s)
7 check(s) passed
0 check(s) failed
0 check(s) warned
0 check(s) not applicable
See log for details: /var/adm/syslog/vseassist.log Example of Managed System Report

| | |
|---|---|
| puny03v4: | |
| CMS hostname resolution | [PASS] |
| WBEM running | [FAIL] |
| ISSUE: The minimum version of HP WBEM Services ('B8465BA' bundle) needed on a managed system is A.02.00.11 and this system has an older version (A.02.00.08). | |
| RESOLUTION: Install a version of HP WBEM Services ('B8465BA' bundle) on the system that is version A.02.00.11 or greater. | |
| WBEM responsive | [PASS] |
| System type matches HP SIM system type | [N/A] |
| Virtual machine WBEM provider validation | [PASS] |
| nPartition WBEM provider validation | [N/A] |
| Virtual partition WBEM provider validation | [N/A] |
| Utilization Provider validation | [PASS] |
| Complex name valid | [N/A] |
| Virtual partition naming conflicts | [N/A] |
| nPartition name valid | [N/A] |
| Compare CMS and managed system nslookup | [N/A] |
| SSH configuration validation | [PASS] |
| Application Discovery agent running | [WARN] |
| WARNING: The Application Discovery agent is not installed on this managed node and is required for application based workloads. | |
| RESOLUTION: If you plan to use this system to create application based workloads, install at least version 3.0.00.00 of Application Discovery ('AppDiscMN' bundle). | |
| Managed system required patches installed | [FAIL] |
| ISSUE: The following patch(es) are required but not installed on this system: PHKL_32518 is required for HP-UX 11iv2 systems that have PRM-Sw-Krn.PRM-KRN installed. This patch is necessary in order for the Fair-Share Scheduler to operate properly. PHKL_33052 is required for HP-UX 11iv2 systems that have PRM-Sw-Krn.PRM-KRN installed. This patch is necessary in order for the Fair-Share Scheduler to operate properly. PHKL_33604 is required for HP-UX 11iv2 systems that have PRM-Sw-Krn.PRM-KRN installed. This patch is necessary in order for the Fair-Share Scheduler to operate properly. PHKL_33605 is required for | |

-continued

```
HP-UX 11iv2 systems that have PRM-Sw-Krn.PRM-KRN installed. This
patch is necessary in order for the Fair-Share Scheduler to operate
properly.
RESOLUTION: Install the patches mentioned above on this system.
File system free space                                    [PASS]
Java JRE bundle installed                                 [PASS]
Fair-Share Scheduler installed                            [PASS]
Processor Sets installed                                  [PASS]
gWLM agent configuration                                  [PASS]
```

Result Summary:
14 verification check(s) performed on 1 system(s)
11 check(s) passed
2 check(s) failed
1 check(s) warned
7 check(s) not applicable
See log for details: /var/adm/syslog/vseassist.log Of course, the foregoing is a very specific example from a particular system. Reports for the same system taken under different conditions would have different results. Reports for different system using the same diagnostic software could have different results. As the invention provides for a variety of diagnostic tools and collective expertise, it also provides for a wide variety of report formats and contents.

The present invention provides for centrally managed computer systems of any size, with any mixture of operating systems and application programs. Different central management systems can be employed. The invention applies to plug-ins that function as application programs and plug-ins that function as utilities. These and other variations upon and modifications to the illustrated embodiments are provided by the present invention, the scope of which is defined by the following claims.

What is claimed is:

1. A method comprising:
executing, using a hardware processor, a diagnostic tool for a centrally managed computer system including a management node and managed nodes, said management node executing central management software for managing said managed nodes, said tool including central diagnostic expertise specifying procedures for diagnosing problems with said central management software;
providing managed software that integrates with said central management software, said managed software including managed diagnostic expertise specifying procedures for diagnosing problems with said managed software; and
importing said managed diagnostic expertise and combining it with said central diagnostic expertise so as to enable said tool to diagnose problems with said managed software.

2. A method as recited in claim 1 further comprising diagnosing said system using said tool and said collective expertise.

3. A method as recited in claim 2 wherein said collective expertise includes procedures and categorizes said procedures as management-node-type, connectivity-type, or managed-node type.

4. A method as recited in claim 3 wherein said managed-diagnostic expertise includes procedures and categorizes said procedures as management-node type, connectivity type, or managed-node type.

5. A method as recited in claim 4 wherein said diagnosing involves implementing said management-node type procedures, then said connectivity-type procedures, and then said managed-node type procedures.

6. A method as recited in claim 2 wherein said diagnosing involves distributing said collective expertise to a managed node.

7. A method as recited in claim 2 further comprising reporting results of said procedures and generating solutions.

* * * * *